Jan. 3, 1967  H. C. CASSEY  3,295,568
UNI-DIRECTIONAL INDEXING MEANS FOR POWER-OPERATED MACHINE
Filed Sept. 17, 1964  2 Sheets-Sheet 1
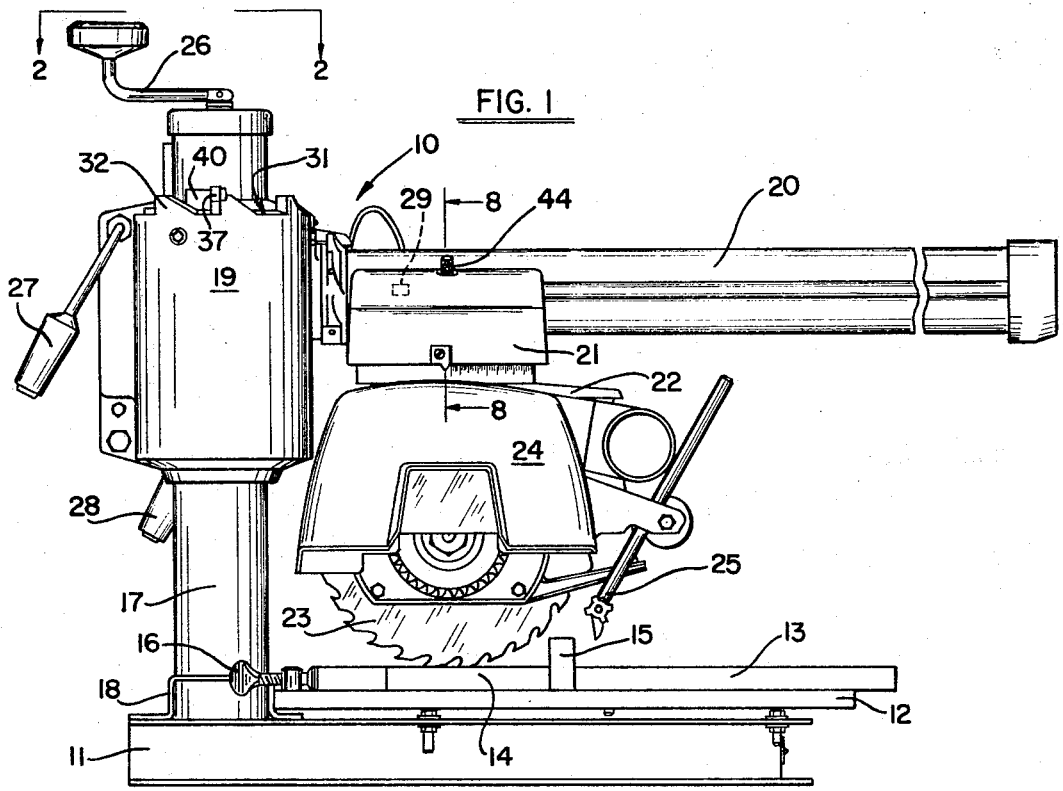
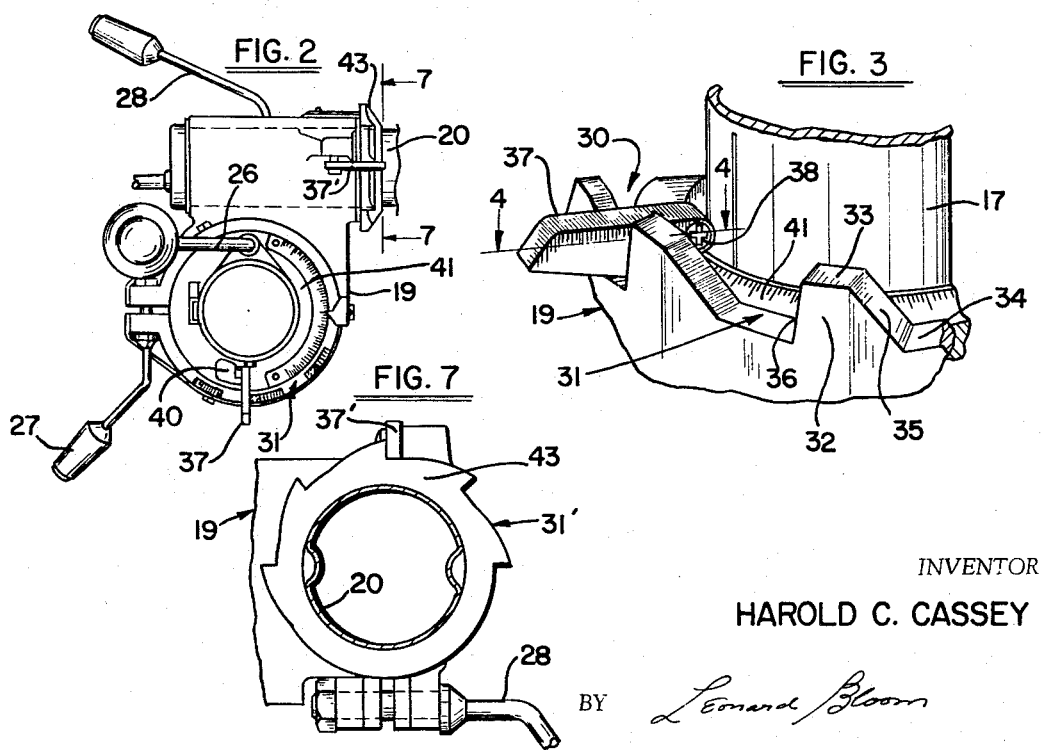
INVENTOR
HAROLD C. CASSEY
BY Leonard Bloom
ATTORNEY Jan. 3, 1967 H. C. CASSEY 3,295,568
UNI-DIRECTIONAL INDEXING MEANS FOR POWER-OPERATED MACHINE
Filed Sept. 17, 1964 2 Sheets-Sheet 2
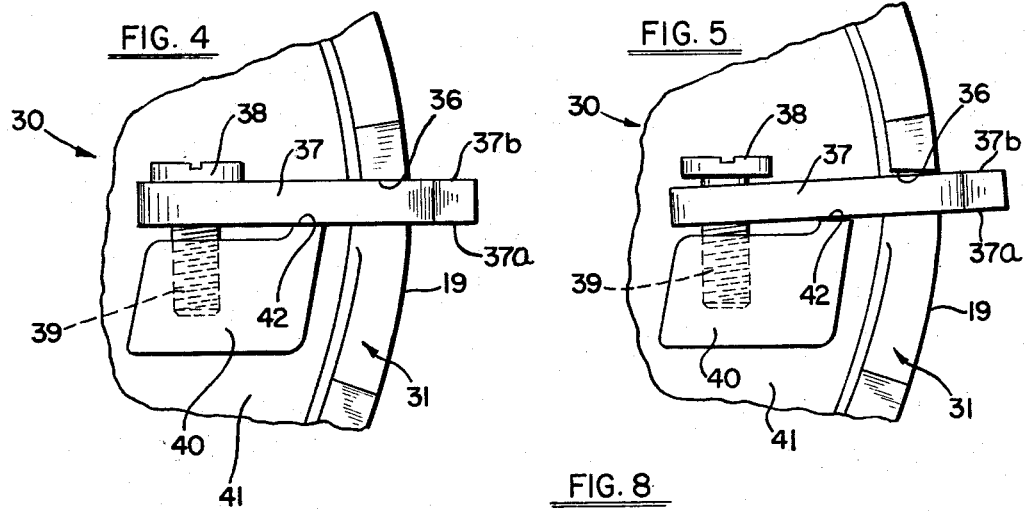
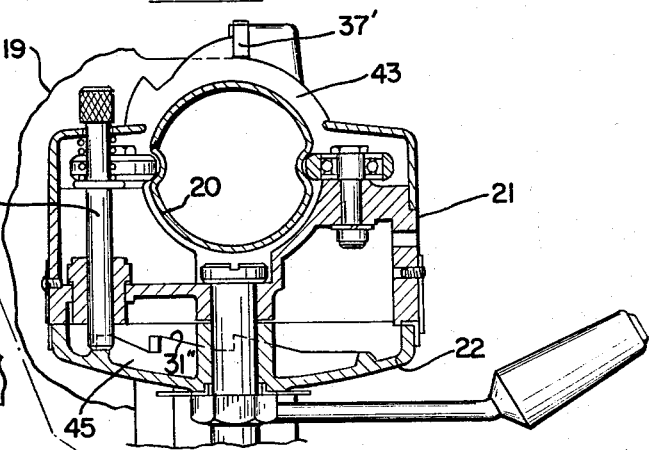
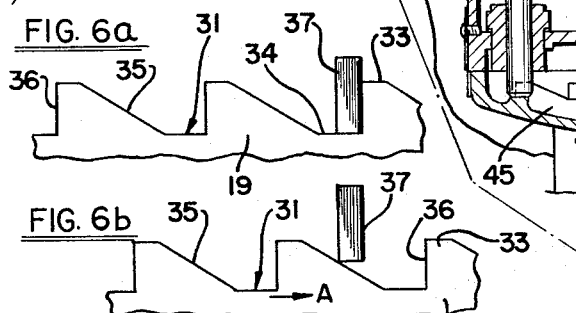
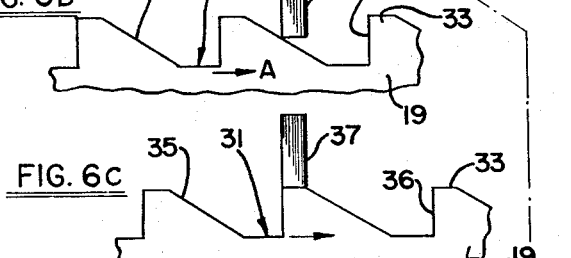
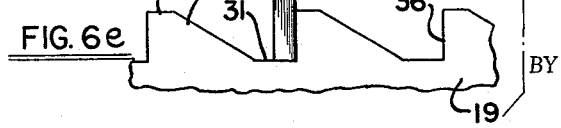
*INVENTOR*
HAROLD C. CASSEY
BY
*ATTORNEY*

United States Patent Office 3,295,568
Patented Jan. 3, 1967

3,295,568
UNI-DIRECTIONAL INDEXING MEANS FOR POWER-OPERATED MACHINE
Harold C. Cassey, Manheim, Pa., assignor to De Walt, Inc., Lancaster, Pa., a corporation of Delaware
Filed Sept. 17, 1964, Ser. No. 397,239
5 Claims. (Cl. 143—6)

The present invention relates to a uni-directional indexing means for a power-operated machine; and more particularly, to an indexing means which is simple and inexpensive to produce, yet one which affords a relatively high degree of precision and convenience.

In the prior art of which I am aware, indexing means have been widely employed in all types of mechanical structures, devices, and power-operated machines; and one such machine, in particular, is a radial arm saw machine, which comprises a frame having a work table, a column at the rear of the table, an arm extending radially from the column, a saw carriage mounted for limited reciprocatory movement on the radial arm, and a motor-driven saw blade mounted on the carriage for engaging a workpiece supported on the table.

In a conventional radial arm saw machine, there are four major articulations or adjustments, and these are as follows: one, a means to raise or lower the saw blade vertically in relation to the work, thereby providing an adjustment in the depth-of-cut; two, a means for circumferentially positioning the saw blade about the vertical axis of the column, thereby facilitating a mitre cut; three, a means for tilting the saw blade about a horizontal axis, thereby facilitating a bevel cut; and four, a means for swiveling the saw blade about a vertical axis and thereafter securing the carriage in a desired position along the radial arm, thereby facilitating a rip cut in which the work is fed into the machine.

In each of the three latter articulations—namely, mitre, bevel, and swivel rip—there is, first, a clamping means to releasably secure the movable or rotatable member to the stationary member, and secondly, there is an indexing means for positively indexing the structural members in relation to each other at certain selected positions in which the machine is more widely used.

In the prior art relating to indexing means for the major articulations of a radial arm saw machine, the traditional practice has been to employ a spring-loaded indexing pin, usually mounted on the stationary member, to cooperate with one of a series of holes or recesses formed in an index plate carried by the movable member. This structural arrangement, however, is generally unsatisfactory for the following reason: one, the radial spacing of the center of the pin to the center of rotation, as well as the center of each hole to the center of rotation, must be accurately located to very close tolerances; two the circumferential spacing of the respective centers of the holes, relative to one another, must also be located to very close tolerances; three, no simple means for adjustment is provided; and four, the mounting of the indexing member on the stationary member, the stresses and forces placed upon the indexing member in usage, particularly bending moments, and the material used in the indexing member, must be carefully considered. Moreover, the end of the indexing pin is usually tapered for piloting reasons; and when engaged, the forces acting between the pin and the index plate, transversely to the center line of the pin, create a wedging action which tends to eject the pin from its respective recess, thereby tending to disengage the pin out of its indexed position. Another indexing arrangement resorted to in the prior art comprises a latching element on the stationary member and a co-operating series of "V" grooves formed in a plate carried by the movable member, but this arrangement has the same general defects as the spring-loaded indexing pin. In summary, the indexing means habitually resorted to in the prior art is expensive to produce, somewhat awkward to use, and difficult to disassemble and to repair.

Accordingly, it is the basic object of the present invention to alleviate the aforementioned deficiencies of the prior art by providing, for use in conjunction with a power-operated machine, such as in a radial arm saw machine, an indexing means which is simple, accurate, reliable, and economical to produce, thereby maintaining precision and convenience at a minimum of expense.

It is another object of the present invention to provide an indexing means which is uni-directional; and thus relative movement between the structural members of the machine can occur in one direction without requiring a manual disengagement of the indexing members, and thereafter, the direction of the relative movement may be reversed, such that the machine is automatically indexed in its desired position.

It is yet another object to provide a uni-directional indexing means which precludes relative movement between the structural members of the machine in the opposite direction unless the indexing means is first manually disengaged.

It is yet still another object to provide a simple and inexpensive indexing means in which each indexed position may be accurately adjusted, thereby providing a means for automatically compensating for misalinements, tolerance accumulations, and wear during the life of the machine.

It is a further object to provide an indexing means whose structure is readily serviceable without requiring any complicated assembly and disassembly of the machine.

It is a still further object to provide an indexing means whose structure is fully exposed, thereby making its function readily apparent to the operator.

In accordance with the broad teachings of the present invention, there is herein illustrated and described, for use in conjunction with a machine having an articulation involving a relative movement between a pair of structural members, an improvement in the indexing means between the members; and this improvement comprises a series of notches formed on one of the members and a co-operating indexing element carried by the other of the members. Each of the notches includes a ramp portion and a shoulder portion, and the indexing element normally abuts against a respective shoulder of one of the notches to preclude a relative movement between the members in one direction. With this arrangement, the indexing element must first be moved out of abutting relationship with its respective shoulder in order to obtain a relative movement between the structural members in the one direction; however, when a relative movement is established between the members in the opposite direction, then the indexing element automatically rides up on the ramp portion of its respective notch, is cammed out of the way, and falls into the next succeeding one of the notches. Thereafter, the direction of the relative movement between the members may be reversed slightly back towards the one direction, whereby the indexing element abuts against the respective shoulder of the next succeeding notch; and consequently, the machine is automatically indexed in its desired adjusted position without necessitating a deliberate manual movement of the indexing element. In this regard, the indexing means is uni-directional.

In accordance with the specific teachings of the present invention, the indexing element comprises a latching element mounted on the stationary structural member of the machine, and either gravity-actuated or spring-loaded, while the series of notches is formed on the movable structural member. In a preferred embodiment, the latching element is pivotably supported upon a headed screw received in a tapped recess formed in a boss on the stationary member. A ledge is formed on the stationary member radially of the boss, and between the screw and the series of notches; and the latching element preferably is formed with planar sides, one of which engages the ledge, and the other of which engages the underside of the headed screw and the substantially flat shoulder of a respective one of the notches. In this manner, the latching element is subjected, mainly, to simple shear forces in a highly localized area between the ledge and the shoulder, and these shear forces are readily accommodated by a reasonable thickness of the latching element; hence there is no necessity for considering any complicated bending forces, which is otherwise an inherent prerequisite of the prior art structures. Moreover, the headed screw functions as a micrometer adjustment and compensates for misalinements, tolerance accumulations, and wear between the indexing surfaces; accordingly, there is no necessity for maintaining the latching element to close tolerances, or the position of the tapped recess in the boss to close tolerances, or the position of the abutting surfaces relative to one another to close tolerances. Consequently, a high degree of precision is maintained with a minimum of expense.

These and other objects of the present invention will become apparent from a reading of the following specification, taken in conjunction with the enclosed drawings, in which:

FIGURE 1 is a side elevation of a typical power-operated machine, such as a radial arm saw machine, within which the teachings of the present invention may be employed;

FIGURE 2 is a partial top plan view, taken along the lines 2—2 of FIGURE 1;

FIGURE 3 is an enlarged fragmentary perspective, showing the indexing means for the mitre articulation of the machine;

FIGURE 4 is a section view, taken along the lines 4—4 of FIGURE 3, showing the latching element in its engaged position;

FIGURE 5 is a view corresponding substantially to that of FIGURE 4, but showing the latching element prior to its abutting engagement with the shoulder formed on the respective notch;

FIGURE 6 is a schematic sequence view, showing the operation and utility of the uni-directional indexing means of the present invention;

FIGURE 7 is a section view, taken along the lines 7—7 of FIGURE 2, and showing the application of the teachings of the present invention to the indexing means for the bevel articulation of the machine; and FIGURE 8 is a section view, taken along the lines 8—8 of FIGURE 1, and showing the application of the teachings of the present invention to the indexing means for the swivel rip articulation of the machine.

With reference to FIGURES 1 and 2, there is illustrated a radial arm saw machine 10 with which the teachings of the present invention may be employed. The machine 10 is described and claimed in the co-pending Kohler et al. application Ser. No. 397,100, filed September 17, 1964, entitled "Radial Arm Saw Machine," and assigned to the assignee of the present invention. However, it will be appreciated by those skilled in the art that the improved indexing means of the present invention may be used in various types of machines and devices other than the particular radial arm saw machine 10.

With this in mind, the radial arm saw machine 10 generally comprises a frame 11 having a pair of cleats, one of which is shown as at 12; a work table 13 supported upon the cleats, the work table having a removable portion 14 held against a work fence 15 by means of a plurality of clamps 16; a stationary column 17 suitably supported within a bracket 18 mounted at the rear of the frame; a hub 19 mounted upon the column; a radial arm 20 supported by the hub and extending over the work table; a saw carriage 21 mounted upon the radial arm; a motor housing 22 supported beneath the carriage; a saw blade 23 mounted on the housing; a guard 24 for the blade; and an anti-kick back device, the latter being generally denoted as at 25.

With further reference to FIGURES 1 and 2, there are four major articulations or adjustments on the machine, and these involve the following elements: one, an elevation crank 26 for raising and lowering the hub 19 (and hence the radial arm 20 and saw blade 23) vertically with respect to the work table, thereby facilitating an adjustment in the depth of cut; two, a mitre clamp 27 for releasably securing the hub 19 with respect to the column 17, so that the hub (and hence the radial arm 20 and the saw blade 22) may be rotated as a unit about the vertical axis of the column, thereby positioning the saw blade preparatory to the making of a mitre cut; three, a bevel clamp 28 for releasably securing the radial arm 20 for rotation about its own axis with respect to the hub, thereby positioning the saw blade for the making of a mitre cut; and four, a means for swiveling the motor housing 22 about a vertical axis with respect to the saw carriage 21, and thereafter, locking the carriage to the arm (in a desired position along the arm) by means of a rip lock 29, whereby the carriage is held stationary and the work is fed into the machine.

In each of the latter three articulations—namely, mitre, bevel, and swivel rip—an improved indexing means is provided between the relatively-movable structural members of the machine. This improved indexing means employs, generally, the same structure and function; and hence will be described, in detail, with reference to the mitre adjustment.

With reference to FIGURES 3, 4 and 5, the improved indexing means, generally denoted as at 30, is provided for the mitre adjustment between the column and the hub to which the arm is secured. This improved indexing means 30 comprises, first, a series of notches 31 formed along the annular periphery 32 of the upper portion of the movable hub 19. Each of the notches 31 comprises a ridge portion 33, a valley portion 34, a sloped ramp portion 35 between the ridge portion and the valley portion, and a substantially flat shoulder 36 at the end of the valley portion and adjacent to the respective ridge of the next succeeding one of the notches. The indexing means further comprises an index latch or latching element 37 carried by the stationary column and cooperating with a respective one of the notches 31 formed on the movable hub 19. If desired, however, the notches 31 could be formed in the stationary member, the column 17, while the latching element 37 could be mounted on the movable member, which is the hub 19.

The latching element 37 is loosely mounted for gravity-actuated pivotal movement upon a headed screw 38 received within a tapped recess 39 formed in a boss 40; this boss 40 is formed on a hub ring 41 which is keyed to the stationary column 17. With this arrangement, the latching element 37 is pivotably supported on an axis which is transversely disposed to the axis of rotation, which in this case is the vertical axis of the column 17. A ledge 42 is formed on the stationary hub ring 41 radially of the boss 40 and between the boss 40 and the notches 31. The latching element 37, in one of its indexed positions, has one of its coplanar sides, denoted as at 37a, abutting against the ledge 42, see FIGURE 4, and its opposite co-planar side, denoted as at 37b, abutting against, first, the underside of the headed screw 38, and secondly, the shoulder 36 of a respective one of the notches 31.

The operation of the indexing means 30 of the present invention may be understood more clearly with reference to FIGURE 6. In FIGURE 6a, the latching element 37 is lodged against the shoulder 36 of a respective one of the notches 31, which precludes movement of the movable member, in this case the hub 19, in a direction towards abutting engagement unless the latching element 37 is first manually lifted out of the way of, or otherwise disengaged from, the respective notches 31. However, as shown in FIGURE 6b, the hub 19 may be moved, in this case rotated, in the direction of the arrow A; and this causes the latching element 37 to ride up the incline of the respective ramp 35, to be cammed out of the way, to ride up over the respective ridge 33, see FIGURE 6c, and to fall down into the next succeeding one of the notches 31 as shown in FIGURE 6d. Thereafter, and as indicated by the arrow B in FIGURE 6d, the direction of rotation of the hub 19 may be reversed slightly, and this causes the latching element 37 to engage the respective shoulder 36 of the next succeeding notch 31. Consequently, the machine is automatically indexed in the next desired position, or in any desired succeeding position, without first requiring a manual disengagement of the cooperating indexing elements; yet in the opposite direction, relative movement between the structural members of the machine is precluded unless the latching element 37 is first lifted out of the way. In this regard, the indexing means of the present invention is unidirectional.

As shown more clearly in FIGURE 4, the latching element 37 is placed, mainly, in simple shear in a highly localized area between a respective one of the substantially flat shoulders 36 formed on the notches 31 and the ledge 42 formed radially of the boss 40. The thickness of the latching element 37 as well as its material and its heat treatment, may be conveniently chosen to easily accommodate these simple shear stresses, and thus there is no necessity for carefully considering the complicated bending or twisting stresses associated with the prior art usage of tapered indexing pins.

Moreover, the headed screw 38, see FIGURE 5, comprises a micrometer adjustment for the indexed position of the latching element 37 in each indexed position of the machine; and thus there is no requirement for holding (to close tolerances) the thickness of the latching element 37, its position in relation to the boss 40, or the position of the tapped recess 39 in the boss.

The position of the respective shoulders 36 of the notches 31 provides for the more widely employed mitre positions of the machine, namely, zero degrees, forty-five left-hand mitre, and forty-five right-hand mitre. However, any angular or circumferential relationship may be provided in accordance with the teachings of the present invention.

FIGURE 7 shows the application of the teachings of the present invention to the bevel articulation of the machine, the latter being facilitated by journaling the tubular radial arm 20 for rotation about its own axis within the hub 19 as described in the aforesaid Kohler et al. application. Here, the indexing or latching element 37' mounted on the hub cooperates with a series of notches 31' formed on a collar 43 secured to the arm, the operation being the same as described previously for the mitre articulation.

FIGURE 8 shows the application of the teachings of the present invention to the swivel rip articulation. Here, the indexing means comprises a spring-loaded indexing pin 44 mounted in the saw carriage 21 and a cooperating series of notches 31" formed in a plate 45 carried within the motor housing 22. The operation is substantially the same as before with two exceptions: one, the pin 44 is spring-loaded, not gravity-actuated; and two, the pin 44 moves vertically about an axis which is parallel to the axis of rotation.

Obviously, many modifications may be made without departing from the basic spirit of the present invention; and accordingly, within the scope of the appended claims, the invention may be practiced other than has been specifically described herein.

I claim:
1. In a machine having a pair of members which are rotatable relative to one another about an axis of rotation, an indexing means between the members, comprising:
 (a) an annular series of notches formed on one of the members, each of said notches including a ramp portion and a projecting shoulder;
 (b) a headed adjusting screw carried by the other member and disposed on an axis transverse to the axis of rotation between the members;
 (c) a ledge formed on the other member, radially of the screw, and between the screw and the annular series of notches formed on the one member;
 (d) an index latch pivotably mounted on the screw about the axis thereof and extending radially therefrom into the annular series of notches;
 (e) said index latch normally abutting against a respective shoulder of the annular series of notches, thereby positively indexing the members relative to one another, and thereby normally precluding relative rotation of the members in one direction without first lifting the index latch out of abutment with the respective shoulder, said index latch riding up a respective ramp and engaging with an adjacent notch to abut against the next respective shoulder upon relative rotation of the members in the opposite direction, whereby the indexing means is uni-directional; and
 (f) said index latch having a pair of side surfaces;
 (g) whereby, in its indexed position, one of the side surfaces of the index latch abuts against the underside of the headed adjusting screw and a respective shoulder on the annular series of notches, spaced radially from the screw; and whereby the other side surface of the index latch abuts against the ledge, radially between the screw and the respective shoulder, thereby placing the index latch in shear between the members; and
 (h) whereby the headed adjusting screw provides a micrometer adjustment for the indexed position of the index latch, thereby compensating for tolerance accumulations, wear, and misalinements of the indexing means between the members.

2. In a radial arm saw machine, the combination of:
 (a) a pair of members, and means mounting the members for rotation relative to one another about an axis;
 (b) an annular series of notches formed on one of the members, each of said notches including a ramp portion and a projecting shoulder;
 (c) an index latch pivotably mounted on the other member about an axis transverse to the axis of rotation and extending therefrom into the annular series of notches formed on the one member;
 (d) said index latch normally abutting against a respective shoulder of the annular series of notches, thereby positively indexing the members relative to one another, and thereby normally precluding relative rotation of the members in one direction without first lifting the index latch out of abutment with the respective shoulders; said index latch riding up a respective ramp and engaging with an adjacent notch to abut against the next respective shoulder upon relative rotation of the members in the opposite direction, thereby providing for uni-directional indexing between the members;
 (e) a ledge formed on the other member;
 (f) said index latch having a pair of side surfaces, one of which normally abuts against the respective shoulder on the one member, and the other of which normally abuts against the ledge on the other member, thereby placing the index latch in shear between the (g) an adjusting screw carried by the other member and abutting against the one side surface of the index latch, opposite from the ledge, thereby providing for a micrometer adjustment for the indexed position of the latch, and thereby compensating for tolerance accumulations, wear, and misalinements between the members; and (h) means to clamp the members together at a selected indexed position.

3. The combination of claim 2, wherein:
(a) the adjusting screw is headed; and wherein the index latch is pivotably mounted on the screw, abuts against the underside of the headed portion of the screw, and is gravity-actuated.

4. In a radial arm saw machine, the combination of:
(a) a column having a vertical axis;
(b) a hub ring keyed to the column and movable vertically thereon;
(c) a hub mounted to the hub ring for conjoint vertical movement on the column and for rotation relative to the hub ring about the vertical axis of the column;
(d) an annular series of notches formed on the hub, each of said notches including a ramp portion and a projecting shoulder;
(e) an index latch carried on the hub ring and cooperating with the annular series of notches formed on the hub;
(f) said index latch normally abutting against a respective shoulder of the annular series of notches, thereby positively indexing the hub relative to the hub ring, and thereby normally precluding rotation of the hub relative to the hub ring in one direction without first lifting the index latch out of abutment with the respective shoulder; said index latch riding up a respective ramp and engaging with an adjacent notch to abut against the next respective shoulder upon rotation of the hub relative to the hub ring in the opposite direction, thereby providing for uni-directional indexing between the hub and hub ring;
(g) screw-threaded micrometer adjusting means carried by the hub ring and engaging the index latch for adjusting the position at which the index latch abuts against the respective shoulder, thereby adjusting the indexed position of the hub relative to the hub ring, and thereby compensating for tolerance accumulations, wear, and misalinements; and (h) means to clamp the hub to the column at the selected indexed position of the hub relative to the hub ring.

5. In a radial arm saw machine, the combination of:
(a) a column;
(b) a hub on the column;
(c) a radial arm journaled in the hub for rotation about its axis;
(d) a collar on the arm, adjacent to the hub;
(e) an annular series of notches formed on the collar, each of said notches including a ramp portion and a projecting shoulder;
(f) an index latch carried by the hub and cooperating with the annular series of notches formed on the collar;
(g) said index latch normally abutting against a respective shoulder of the annular series of notches, thereby positively indexing the arm relative to the hub, and thereby normally precluding rotation of the arm relative to the hub in one direction without first lifting the index latch out of abutment with the respective shoulder; said index latch riding up a respective ramp and engaging with an adjacent notch to abut against the next respective shoulder upon rotation of the arm relative to the hub in the opposite direction, thereby providing for uni-directional indexing between the arm and the hub;
(h) screw-threaded micrometer adjusting means carried by the hub and engaging the index latch for adjusting the position at which the index latch abuts against the respective shoulder, thereby adjusting the indexed position of the arm relative to the hub, and thereby compensating for tolerance accumulations, wear, and misalinements; and
(i) means to clamp the arm to the hub at the selected indexed position of the arm relative to the hub.

References Cited by the Examiner

UNITED STATES PATENTS

| | | | |
|---|---|---|---|
| 430,895 | 6/1890 | Stafford | 74—541 |
| 1,250,490 | 12/1917 | Newman | 74—817 |
| 1,406,339 | 2/1922 | Browand | 74—817 |
| 1,852,387 | 4/1932 | Wieden | 143—6 |
| 2,312,356 | 3/1943 | Ocenasek | 143—6 |
| 2,360,588 | 10/1944 | Sawicki. | |

DONALD R. SCHRAN, *Primary Examiner.*